(12) United States Patent
Yan et al.

(10) Patent No.: US 10,945,053 B2
(45) Date of Patent: Mar. 9, 2021

(54) METHOD AND DEVICE FOR PROCESSING SERVICE CROSSING MASTER NODE

(71) Applicant: ZTE CORPORATION, Shenzhen (CN)

(72) Inventors: Fen Yan, Shenzhen (CN); Lei Wang, Shenzhen (CN); Daowei Zhang, Shenzhen (CN); Gaofeng An, Shenzhen (CN); Zhiliang Ren, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 227 days.

(21) Appl. No.: 15/021,424

(22) PCT Filed: Jun. 16, 2014

(86) PCT No.: PCT/CN2014/079995
§ 371 (c)(1),
(2) Date: Mar. 11, 2016

(87) PCT Pub. No.: WO2014/187425
PCT Pub. Date: Nov. 27, 2014

(65) Prior Publication Data
US 2016/0227302 A1    Aug. 4, 2016

(30) Foreign Application Priority Data
Sep. 13, 2013 (CN) .......................... 201310418257.4

(51) Int. Cl.
*H04Q 11/00* (2006.01)
*H04L 12/42* (2006.01)
*H04L 12/64* (2006.01)

(52) U.S. Cl.
CPC ......... *H04Q 11/0066* (2013.01); *H04L 12/42* (2013.01); *H04L 12/6418* (2013.01);
(Continued)

(58) Field of Classification Search
CPC ..... H04L 12/42; H04L 12/6418; H04L 12/43; H04L 12/437; H04L 12/56; H04L 12/16;
(Continued)

(56) References Cited

U.S. PATENT DOCUMENTS 6,556,548 B1 *  4/2003  Kirkby ................... H04L 47/15
                                                          370/322
8,891,352 B2 * 11/2014  Zou ....................... H04L 27/2602
                                                          370/208

(Continued)

FOREIGN PATENT DOCUMENTS

CN         1512698 A       7/2004
CN         1512698 A1      7/2004
(Continued)

OTHER PUBLICATIONS

International Search Report (Form PCT/ISA/210) for International Application No. PCT/CN2014/079995 dated Sep. 4, 2014.
(Continued)

*Primary Examiner* — Un C Cho
*Assistant Examiner* — Rasha K Fayed
(74) *Attorney, Agent, or Firm* — Cantor Colburn LLP

(57) ABSTRACT

Provided are a method and device for processing a service crossing the master node, which relate to the communications field, and solve a problem of a resource conflict caused by the service crossing the master node in the OBTN. The method comprises: when assigning a bandwidth for a service requested by each node within the present DBA period, a master node selects a processing strategy; the master node eliminates, according to the selected processing strategy, a resource conflict caused by the service crossing the master node, and assigns a bandwidth to the service requested by each node. The technical solution provided by the present
(Continued)

disclosure is applicable to the OBTN, thereby implementing highly reliable OBTN resource scheduling.

11 Claims, 12 Drawing Sheets

(52) U.S. Cl.
CPC ............... *H04Q 2011/009* (2013.01); *H04Q 2011/0086* (2013.01); *H04Q 2213/13332* (2013.01)

(58) Field of Classification Search
CPC ....... H04L 12/427; H04L 47/10; H04L 47/28; H04L 47/762; H04L 47/823; H04L 47/783; H04L 47/15; H04L 47/70; H04L 63/1433; H04L 63/1466; H04L 5/24; H04L 25/4904; H04L 41/12; H04L 45/20; H04L 67/327; H04L 67/2842; H04L 29/12216; H04W 72/0453; H04Q 11/006; H04Q 11/0066; H04Q 11/0005; H04Q 11/00; H04Q 11/0062; H04Q 2011/0086; H04Q 2011/009; H04Q 2011/0064; H04Q 2011/0092; H04Q 2011/0045; H04Q 2011/0033; H04Q 2213/13332
USPC .................................... 370/468, 404; 398/45
See application file for complete search history.

(56) References Cited

U.S. PATENT DOCUMENTS

| | | | | |
|---|---|---|---|---|
| 9,466,036 | B1* | 10/2016 | Vicaire | H04L 67/10 |
| 2002/0194362 | A1* | 12/2002 | Rawlins | H04L 47/724 709/235 |
| 2003/0185229 | A1* | 10/2003 | Shachar | H04L 29/12216 370/460 |
| 2004/0017825 | A1* | 1/2004 | Stanwood | H04W 72/1236 370/468 |
| 2004/0037301 | A1* | 2/2004 | Shachar | H04L 61/2007 370/404 |
| 2004/0042796 | A1* | 3/2004 | Con-Carolis | H04J 14/0294 398/83 |
| 2006/0264177 | A1* | 11/2006 | Heidari-Bateni | H04W 28/20 455/62 |
| 2007/0064731 | A1* | 3/2007 | Mizutani | H04L 47/15 370/468 |
| 2007/0140258 | A1* | 6/2007 | Tan | H04B 10/272 370/395.21 |
| 2009/0162065 | A1* | 6/2009 | Mizutani | H04J 3/0655 398/66 |
| 2009/0219879 | A1* | 9/2009 | Zimmerman | H04W 72/0453 370/329 |
| 2010/0149967 | A1* | 6/2010 | Johansen | H04L 45/26 370/225 |
| 2012/0008948 | A1* | 1/2012 | Kazawa | H04L 12/44 398/58 |
| 2012/0020662 | A1* | 1/2012 | Ding | H04B 10/0773 398/38 |
| 2012/0044955 | A1* | 2/2012 | Chandrasekaran | H04L 47/765 370/468 |
| 2012/0176990 | A1* | 7/2012 | Zou | H04L 5/0037 370/329 |
| 2012/0224858 | A1* | 9/2012 | Chen | H04Q 11/0067 398/98 |
| 2014/0119730 | A1* | 5/2014 | Wu | H04L 47/00 398/58 |
| 2014/0178066 | A1* | 6/2014 | Patel | H04L 67/2842 398/45 |
| 2014/0186039 | A1* | 7/2014 | Luo | H04L 12/287 398/66 |
| 2015/0131991 | A1* | 5/2015 | Hattori | H04J 14/0257 398/47 |
| 2015/0270986 | A1* | 9/2015 | Wang | H04L 47/522 370/230 |

FOREIGN PATENT DOCUMENTS

| | | |
|---|---|---|
| CN | 1787516 A | 6/2006 |
| CN | 101895367 A | 11/2010 |
| EP | 2309666 A2 | 4/2011 |

OTHER PUBLICATIONS

Ning Deng et al: "A novel optical burst ring network with optical-layer aggregation and flexible bandwidth provisioning". 2011 Optical Fiber Communication Conference and Exposition and the National Fiber Optic Engineers Conference (OFC/NFOEC 2011) : Los Angeles. California. USA. Mar. 6-10, 2011. IEEE. Piscataway. NJ. USA. Mar. 6, 2011 (Mar. 6, 2011). pp. 1-3. XP031946433. ISBN: 978-1-4577-0213-6.

European Search Report for Application No. 14800246.2; dated Aug. 16, 2016.

* cited by examiner

|   | A | B | C | D |
|---|---|---|---|---|
| A |   | 1 | 4 | 4 |
| B | 4 |   | 4 | 1 |
| C | 2 | 2 |   | 3 |
| D | 3 | 3 | 5 |   |

Fig. 6

| | 1 | 2 | 3 | 4 | 5 | 6 | 7 | 8 | 9 | 10 |
|---|---|---|---|---|---|---|---|---|---|---|
| λ1 | A→D<br>D→C(add) | A→D<br>D→C(add) | A→D<br>D→C(add) | A→D<br>D→C(add) | B→A | C→B(drop)<br>B→A | C→B(drop)<br>B→A | C→B(drop)<br>B→A | D→C(drop)<br>C→B(add) | D→C(drop) |
| λ2 | C→A<br>B→C | C→A<br>B→C | D→B(drop)<br>B→C<br>C→B(add) | D→B(drop)<br>B→C | D→B(drop)<br>D→C(add)<br>C→D | A→C<br>D→B(add)<br>C→D | A→C<br>D→B(add) | A→C<br>C→D<br>D→B(add) | A→C<br>D→A | B→D<br>A→B |

|   | A | B | C | D |
|---|---|---|---|---|
| A |   | 4 | 3 | 2 |
| B | 3 |   | 3 | 4 |
| C | 3 | 2 |   | 4 |
| D | 2 | 1 | 1 |   |

Fig. 10

|  | 1 | 2 | 3 | 4 | 5 | 6 | 7 | 8 | 9 | 10 |
|---|---|---|---|---|---|---|---|---|---|---|
| λ1 | A→B<br>B→A | A→B<br>B→A | A→B<br>B→A | A→C<br>C→A | A→C<br>C→A | A→C<br>D→A | A→D<br>D→A | A→D<br>D→A | C→D<br>A→B<br>B→C | B→D |
| λ2 | C→D<br>D→C | C→D<br>D→C | C→D | D→B<br>B→D | D→B<br>B→D | B→D | B→C<br>C→B | B→C<br>C→B |  | C→A |

METHOD AND DEVICE FOR PROCESSING SERVICE CROSSING MASTER NODE

TECHNICAL FIELD

The present disclosure relates to the communications field, and in particular to a method and device for processing a service crossing a master node in an Optical Burst Transport Network (OBTN for short).

BACKGROUND

Data services become the main body of current network traffic. The flexible pipeline and statistic multiplexing characteristics of a packet switched network are naturally applicative to data services. However, the current packet switching technology is processed substantially based on an electrical layer, which brings high costs and large energy consumption. With the rapid growth of the traffic, the processing bottleneck is outstanding day by day. Optical networks have the advantages of a low cost, low energy consumption, a high speed and a large volume, but traditional optical circuit switched networks (e.g. a WDM and an OTN) can only provide rigid pipelines with large grain, lacks the flexibility of electric packet switching technology, and is not able to bear data services effectively. Therefore, combining the advantages of an optical layer and an electrical layer becomes the trend of development of a transport network, and an OBTN is generated in this circumstance.

An OBTN adopts an OB-based overall optical switched technology, which has the capacity of providing on demand and quickly scheduling the bandwidth of optical layers among any pair nodes of a network, which can improve the resource usage efficiency and network flexibility, meanwhile retain the advantages of a high speed, large volume and low cost of the optical layer, and is applicable to a network with a star/tree/ring network topology.

The optical receiving and transmitting type of a node in an OBTN network comprises three types: 1. transmitting tuneablely+receiving selectively; 2. transmitting fixed+receiving selectively; and 3. transmitting tuneablely+receiving fixedly. The same transmitter or receiver of the same node can only transmit or receive one service at the same time.

In the OBTN network, a Dynamic Bandwidth Allocation (DBA for short) mechanism is used to achieve the dynamic sensing and assignment of network traffics. In an OBTN ring network, the scheduling of resources is achieved by a master control node (that is the above master node). The master control node assigns different services on various wavelengths and various time slots on a wavelength via the DBA mechanism, generates a BandWidth Map (also named to as a resource assignment table), and distributes the BandWidth Map to each slave node via a control channel, and each slave node performs add and drop services according to the BandWidth map.

In the OBTN ring network, the time consuming that data starts from a certain node, circles for a round, and returns to the current node is referred to as a ring period. The ring period is generally an integral multiple of a frame period.

The time consuming from the current DBA operation to an adjacent next DBA is referred to as a DBA period. The ideal status of the scheduling dynamically of the resources is that operation and scheduling are performed once for one frame, i.e. The DBA period and the frame period are the same, thereby ensuring the best dynamic response performance of the network. In applications, the algorithm complexity and implementation difficulty of device technology are comprehensively considered, the DBA period is generally an integral multiple of the frame period, and generally, the DBA period is an integral multiple of the ring period or the ring period is an integral multiple of the DBA period.

Where a route of a service needs to be directly connected to a master node, the service is referred to as a service crossing a master node. During the process of resource assignment, the service crossing the master node may influence the assignment, receiving and transmitting of a service in a next ring period. As shown in FIG. 1, the direction of a data stream is an anticlockwise direction: from A to B to C to D to A; when a route of a service is from node C to node B, a time slot position 3 of a wavelength $\lambda 2$ is used, the service needs to across the master node A, and then in a next ring period, a service with the route from A to B cannot use a channel of the time slot position 3 of the wavelength $\lambda 2$ and the add and drop services of the service cannot be performed at this position, or otherwise link conflicts and the conflicts that a receiver receives a service may occur. How to solve the problem of resource conflicts introduced by a service crossing the master node, different processing needs to be performed with regard to different scenes.

SUMMARY

A method for processing a service crossing a master node is provided in the embodiment of the present disclosure, so as to at least solve a problem of a resource conflict caused by the service crossing the master node in an OBTN in the related art.

According to one aspect of the embodiment of the present disclosure, a method for processing a service crossing a master node is provided, and the method comprises: selecting, by the master node, a processing strategy when assigning a bandwidth for a service requested by each node within a present Dynamic Bandwidth Assignment (DBA) period; and eliminating, by the master node, a resource conflict caused by the service crossing the master node according to the selected processing strategy, and assigning, by the master node, the bandwidth for the service requested by the each node.

In an example embodiment, selecting, by the master node, the processing strategy when assigning the bandwidth for the service requested by the each node within the present DBA period comprises: selecting, by the master node, the processing strategy for the service crossing the master node according to a requirement of a DBA operation, wherein the processing strategy comprises: a retention strategy and/or an elimination strategy.

In an example embodiment, a DBA period is M times of a frame period, a ring period is N times of the frame period, and M is an integral multiple of N or N is an integral multiple of M, and selecting, by the master node, the processing strategy for the service crossing the master node according to the requirement of the DBA operation, wherein the processing strategy comprises: the retention strategy and/or the elimination strategy, comprises: where M is slightly greater than N or M=N or M<N, selecting the retention strategy; and where M is much greater than N, selecting the elimination strategy.

In an example embodiment, after selecting, by the master node, the processing strategy when assigning the bandwidth for the service requested by the each node within the present DBA period, the method further comprises: grouping a plurality of consecutive data frames that use a same BandWidth map within one DBA period into one frame set.

In an example embodiment, grouping the plurality of the consecutive data frames that use the same BandWidth map within one DBA period into one frame set comprises: where M<N, grouping M frames in one DBA period into one frame set, or, where M=N, grouping M frames in one DBA period into one frame set, or, where M is slightly greater than N, grouping previous N frames in one DBA period into a first frame set, and grouping next (M−N) frames into a second frame set, or, where M is much greater than N, grouping previous N frames in one DBA period into a first frame set, grouping $(N+1)^{th}$ to $(M-N)^{th}$ frames into a second frame set, and grouping last N frames into a third frame set.

In an example embodiment, where M<N, eliminating, by the master node, the resource conflict caused by the service crossing the master node according to the selected processing strategy and assigning the bandwidth for the service requested by the each node comprises: eliminating, by the master node, from the frame set a wavelength and a time slot position occupied by the service crossing the master node of M frames in previous N/M DBA periods; and using, by the master node, remaining resources in the frame set to assign the bandwidth for the service requested by the each node and generating, by the master node, a BandWidth map for M frames in one DBA period.

In an example embodiment, where M=N, eliminating, by the master node, the resource conflict caused by the service crossing the master node according to the selected processing strategy and assigning the bandwidth for the service requested by the each node comprises: eliminating, by the master node, from the frame set a wavelength and a time slot position occupied by the service crossing the master node of M frames in one previous DBA period; and using, by the master node, remaining resources in the frame set to assign the bandwidth for the service requested by the each node and generating, by the master node, a BandWidth map for M frames in one DBA period.

In an example embodiment, where M is slightly greater than N, eliminating, by the master node, the resource conflict caused by the service crossing the master node according to the selected processing strategy and assigning the bandwidth for the service requested by the each node comprises: eliminating, by the master node, from the first frame set a wavelength and a time slot occupied by the service crossing the master node of last (M−N) frames in one previous DBA period, using, by the master node, remaining resources in the first frame set to assign the bandwidth for the service requested by the each node, and generating, by the master node, a BandWidth map for the previous N frames; and eliminating, by the master node, from the second frame set a wavelength and a time slot occupied by the service crossing the master node of the first N frames in the present DBA period, using, by the master node, remaining resources in the second frame set to assign a bandwidth for the service requested by the each node, and generating, by the master node, a BandWidth map for the last (M−N) frames.

In an example embodiment, where M is much greater than N, eliminating, by the master node, the resource conflict caused by the service crossing the master node according to the selected processing strategy and assigning the bandwidth for the service requested by the each node comprises: initializing a resource assignment table, calculating and assigning a bandwidth for the service requested by the each node according to a principle of no resource conflict, and generating a BandWidth map of the second frame set; eliminating, by the master node, from the second frame set a drop service crossing the master node in the second frame set, and obtaining a BandWidth map for the first frame set of the previous N frames; and eliminating, by the master node, from the second frame set an add service crossing the master node in the second frame set, and obtaining a BandWidth map for the third frame set of the last N frames.

According to anther aspect of the present disclosure, a device for processing a service crossing a master node is provided, and the device comprises: a strategy selection component, configured to select a processing strategy for processing the service crossing the master node when assigning a bandwidth for a service requested by each node within a present Dynamic Bandwidth Assignment (DBA) period; and a bandwidth assignment component, configured to eliminate a resource conflict caused by the service crossing the master node according to the selected processing strategy, and assign the bandwidth for the service requested by the each node.

In an example embodiment, a DBA period is M times of a frame period, a ring period is N times of the frame period, and M is an integral multiple of N or N is an integral multiple of M, and the strategy selection component, is configured to select the processing strategy for the service crossing the master node according to the requirement of the DBA operation, wherein the processing strategy comprises: a retention strategy and/or an elimination strategy, and the strategy selection component comprises: a first selection element, configured to select the retention strategy where M is slightly greater than N or M=N or M<N; and a second selection element, configured to select the elimination strategy where M is much greater than N.

In an example embodiment, the device further comprises: a frame set grouping component, configured to group a plurality of consecutive data frames that use a same BandWidth map within one DBA period into one frame set.

In an example embodiment, the frame set grouping component comprises: a first grouping element, configured to group M frames in one DBA period into one frame set where M<N; a second grouping element, configured to group M frames in one DBA period into one frame set where M=N; a third grouping element, configured to group previous N frames in one DBA period into a first frame set, and group next (M−N) frames into a second frame set where M is slightly greater than N; and a fourth grouping element, configured to group previous N frames in one DBA period into a first frame set, group $(N+1)^{th}$ to $(M-N)^{th}$ frames into a second frame set, and group last N frames into a third frame set where M is much greater than N.

In an example embodiment, the bandwidth assignment component comprises: a first assignment element, configured to, where M<N, eliminate from the frame set a wavelength and a time slot position occupied by the service crossing the master node of M frames in previous N/M DBA periods, use remaining resources in the frame set to assign the bandwidth for the service requested by the each node, and generate a BandWidth map for M frames in one DBA period; a second assignment element, configured to, where M=N, eliminate from the frame set a wavelength and a time slot position occupied by the service crossing the master node of M frames in one previous DBA period, use remaining resources in the frame set to assign the bandwidth for the service requested by the each node, and generate a BandWidth map for M frames in one DBA period; a third assignment element, configured to, where M is slightly greater than N, eliminate from the first frame set a wavelength and a time slot occupied by the service crossing the master node of last (M−N) frames in one previous DBA period, use remaining resources in the first frame set to assign the bandwidth for the service requested by the each node, generate a BandWidth map for the previous N frames, and eliminate from the second frame set a wavelength and a time slot occupied by the service crossing the master node of the first N frames in the present DBA period, use remaining resources in the second frame set to assign a bandwidth for the service requested by the each node, and generate a BandWidth map for the last (M−N) frames; and a fourth assignment element, configured to, where M is much greater than N, initialize a resource assignment table, calculate a bandwidth for the service requested by the each node and assign the bandwidth according to a principle of no resource conflict, generate a BandWidth map for the second frame set, eliminate from the second frame set a drop service crossing the master node in the second frame set, obtain a BandWidth map for the first frame set of the previous N frames, and eliminate from the second frame set an add service crossing the master node in the second frame set, and obtain a BandWidth map for the third frame set of the last N frames.

A method for processing a service crossing a master node is provided in the embodiment of the present disclosure. When assigning a bandwidth for a service requested by each node within a present DBA period, a master node selects a processing strategy; and the master node eliminates, according to the selected processing strategy, a resource conflict caused by a service crossing the master node, and assigns a bandwidth for the service requested by the each node, thereby implementing highly reliable OBTN resource scheduling, and solving the problem of a resource conflict caused by a service crossing the master node in the OBTN.

BRIEF DESCRIPTION OF THE DRAWINGS

Figure 6:
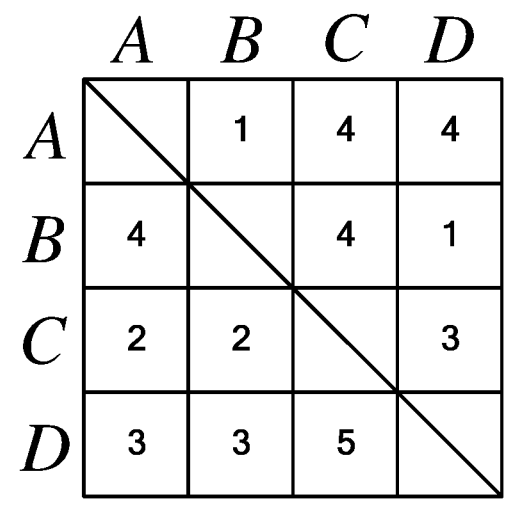

FIG. 6 is a schematic diagram of a request matrix quantised by a retention strategy in embodiment two of the present disclosure;

FIG. 8 is a schematic diagram of a BandWidth map obtained by a retention strategy after processing in embodiment two of the present disclosure;

FIG. 9 is a schematic diagram of add and drop services table obtained by extracting from a node;

FIG. 10 is a schematic diagram of a request matrix quantised by an elimination strategy in embodiment two of the present disclosure;

FIG. 11 is a schematic diagram of a BandWidth map obtained after processing by an elimination strategy in embodiment two of the present disclosure;

FIG. 12 is a schematic diagram of information of the service crossing the master node about an elimination strategy in embodiment two of the present disclosure;

FIG. 13 is an add and drop service table of the 1st to 4th frames obtained after processing by an elimination strategy in embodiment two of the present disclosure;

FIG. 14 is an add and drop service table of the fifth to the 28th frame obtained after processing by an elimination strategy in embodiment two of the present disclosure;

FIG. 15 is an add and drop service table of the $29^{th}$ to the $32^{th}$ frame obtained after processing by an elimination strategy in embodiment two of the present disclosure;

DETAILED DESCRIPTION OF THE EMBODIMENTS

Figure 1:
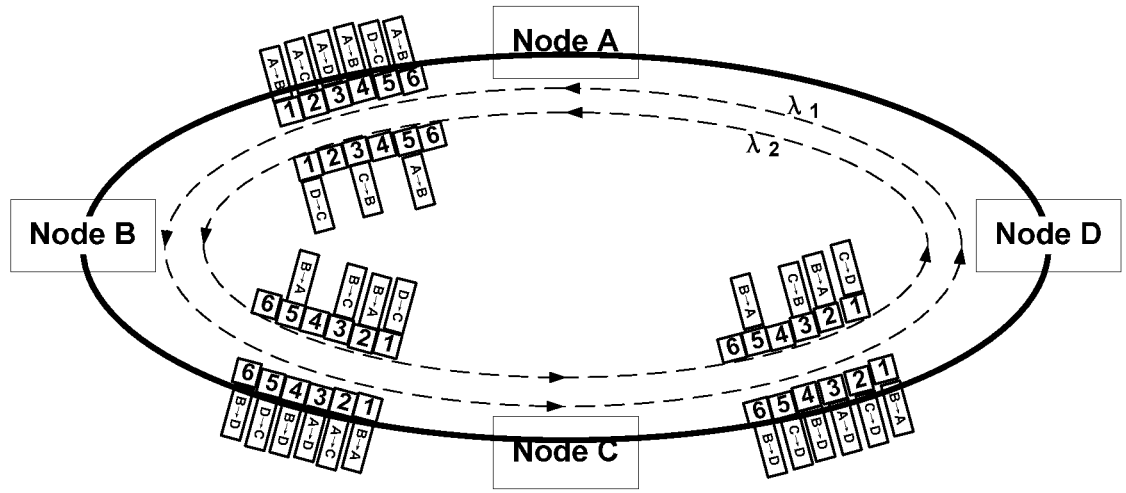
FIG. 1 is a schematic diagram of the operating principle of a fundamental structure of an OBTN ring network.

During the process of resource assignment, a service crossing the master node may influence the assignment, receiving and transmitting of a service in a next ring period. In order to solve this problem, a method for processing a service crossing the master node is provided in the embodiments of the present disclosure. The embodiments of the present disclosure will be described in detail with combination of the accompanying drawings hereinafter. It needs to note that the embodiments of the present application and the features in the embodiments can be combined with each other if there is no conflict.

Firstly, with combination of the accompanying drawings, embodiment one of the present disclosure is described.

A method for processing a service crossing the master node is provided in the embodiment of the present disclosure, which effectively avoids a resource conflict introduced by a service crossing the master node during dynamic resource assignment in the OBTN network, improves the operating efficiency of resource assignment, and improves the bearer capability of a network.

The application scenario of the embodiments of the present disclosure is:

The application scenario is the OBTN ring network supporting unidirection or bidirection, wherein there is a master node in the OBTN, and the others are slave nodes; a control channel of each node uses a common transmitter and a receiver, a data channel of each node uses any one of three receiving and transmitting modes; the way of OB-based time division multiplexing is used; the control of add and drop services of each node in the network is dynamically computed and assigned by the master node according to a service request, i.e. it is achieved by a dynamic bandwidth assignment algorithm; and a DBA period is M times of a frame period, a ring period is N times of the frame period, and M is an integral multiple of N or N is an integral multiple of M.

In the embodiment of the present disclosure, a master node performs one time of DBA algorithm when each DBA period starts, to generate 1-3 different BandWidth maps, and the same map may be applied to a plurality of consecutive data frames. For sake of convenient expression, in the embodiment of the present disclosure, a group of consecutive data frames using the same BandWidth map are defined as a frame set.

Since a service crossing the master node of the $i^{th}$ frame may influence the $(i+N)^{th}$ frame after a ring period, the influence of a cross-ring service of the $i^{th}$ frame needs to be considered when a bandwidth resource is assigned for the service of the $(i+N)^{th}$ frame. A frame set where the $i^{th}$ frame is located is defined as a previous correlative frame set to a frame set where the $(i+N)^{th}$ frame is located.

There are two strategies for dynamically processing the bandwidth of the service crossing the master node, so as to support the method for processing the service crossing the master node referred by the present disclosure.

Two strategies are as follows:

1. A retention strategy, the state of the service crossing the master node state of a previous correlative frame set is transmitted to a present frame set, and the problems of a receiving conflict and a link usage conflict caused by the service crossing the master nodes are considering when computing a BandWidth map of the present frame set. In the retention strategy, where M>N, the previous correlative frame set is namely the set constituted by the last (M−N) frames in a previous DBA period; where M=N, the previous correlative frame set is namely the set constituted by the M frames in the previous DBA period; and where M<N, the previous correlative frame set is namely the set constituted by the M frames in the previous N/M of DBA period.

For example, where M=8, and N=4, the previous correlative frame set is namely the set constituted by the last 4 frames in a previous DBA period; where M=N=4, the previous correlative frame set is namely the set constituted by the 4 frames in the previous DBA period; and where M=2, and N=8, the previous correlative frame set is namely the set constituted by the two frames in the previous four DBA periods.

2. An elimination strategy, a service crossing a master node is directly eliminated from a previous correlative frame set, so as to ensure that the service crossing the master node in the previous correlative frame set may not across the present frame set, so that there is no need to consider the problems of a receiving conflict and a link usage conflict caused by a previous service crossing the master node when a BandWidth map of the present frame set is computed, thereby improving the computing efficiency of a DBA algorithm. In the elimination strategy, the previous correlative frame set is namely the set constituted by the last N frames of a previous DBA period.

In practical application, it is decided whether a retention strategy or an elimination strategy is selected according to requirements of the DBA operation, and principles are as follows:

when the real-time requirements of the DBA operation is relatively high or a DBA scheduling period is relatively short, similarly to a ring period, the elimination strategy may bring relatively great effect on the transport efficiency of a cross-ring service, and the retention strategy is preferably selected; and "similarly to the ring period" discussed herein particularly refers to that M is slightly greater than or smaller than or equal to N, and M being slightly greater generally means that M is not greater than 8 times of N.

When the real-time requirements of the DBA operation is not high and a DBA scheduling period is relatively long, much greater than a ring period (i.e. M is much greater than N, e.g. M is greater than or equal to 8 times of N), the elimination strategy may bring relatively small effect on the transport efficiency of a cross-ring service, and the elimination strategy is preferably selected.

Figure 2:
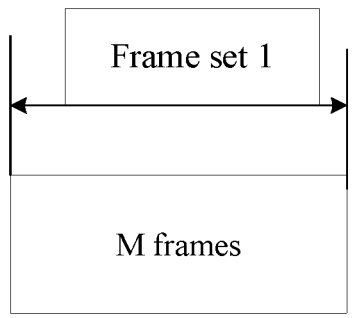
FIG. 2 is a schematic diagram of a DBA period having only one frame set.
Figure 3:
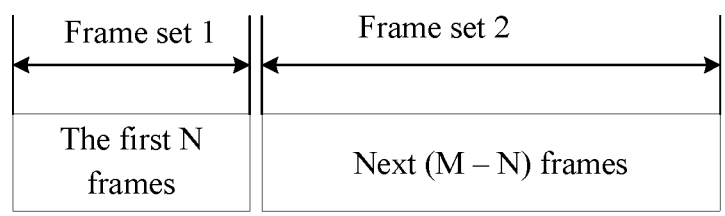
FIG. 3 is a schematic diagram of a DBA period grouped into two frame sets.
Figure 4:
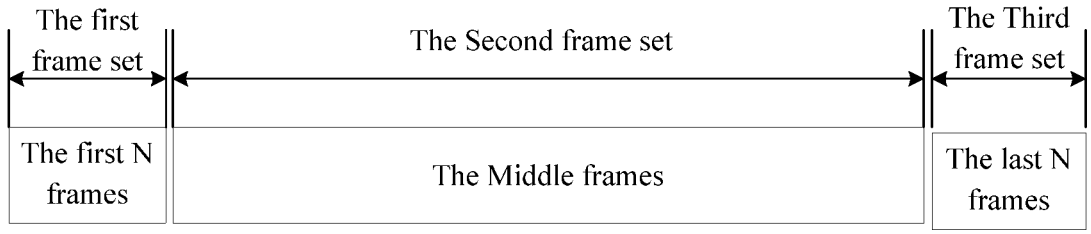
FIG. 4 is a schematic diagram of a DBA period grouped into three frame sets.

As shown in FIG. 2, where the retention strategy is used, when M<=N, one DBA period only comprises one frame set: frames of [1, M]. As shown in FIG. 3, when M>N, one DBA period is grouped into two frame sets: a first frame set, frames of [1, N]; and a second frame set, frames of [N+1, M]. As shown in FIG. 4, where the elimination strategy is used, one DBA period is grouped into three frame sets: a first frame set, frames of [1, N]; a second frame set, frames of [N+1, M−N]; and a third frame set, frames of [M−N+1, M]. Each frame set uses the same BandWidth map.

Figure 5:
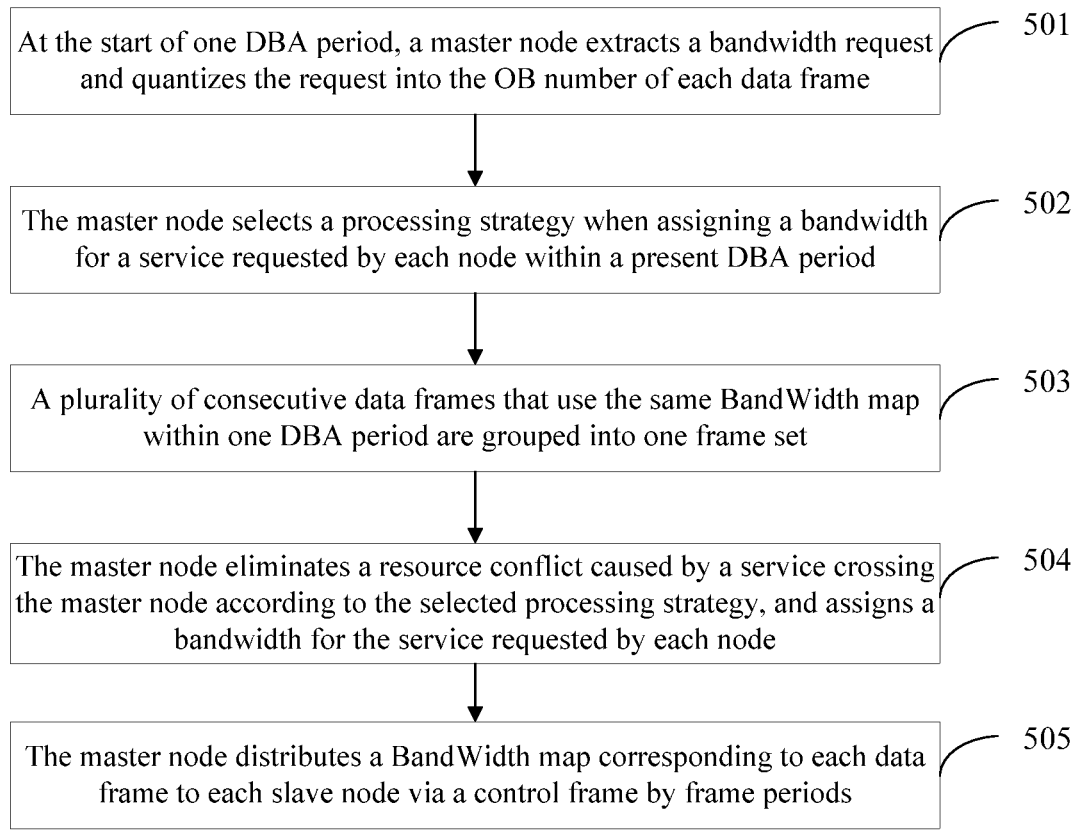
FIG. 5 is a flowchart of a method for processing a service crossing the master node provided in embodiment one of the present disclosure.

A method for processing a service crossing the master node in an OBTN network is provided in the embodiment of the present disclosure. The process of method to complete the bandwidth assignment is as shown in FIG. 5, comprising:

Step 501, at the start of one DBA period, a master node extracts a bandwidth request and quantizes the request into the OB number of each data frame;

Step 502, when assigning a bandwidth for a service requested by each node within the present DBA period, the master node selects a processing strategy;

In this step, the master node selects the processing strategy for the service crossing the master node according to the requirement of the DBA operation, wherein the processing strategy comprises a retention strategy and/or an elimination strategy.

Step 503, a plurality of consecutive data frames using the same BandWidth map within one DBA period is grouped into one frame set;

This step specifically comprises as follows:

where M<N, M frames in one DBA period are grouped into one frame set, or, where M=N, M frames in one DBA period are grouped into one frame set, or, where M is slightly greater than N, the previous N frames in one DBA period are grouped into a first frame set, and the succeeding (M−N) frames are grouped into a second frame set, or, where M is much greater than N, the first N frames in one DBA period are grouped into a first frame set, the $(N+1)^{th}$ to the $(M-N)^{th}$ frames are grouped into a second frame set, and the last N frames are grouped into a third frame set.

Step 504, the master node eliminates the resource conflict caused by a service crossing the master node according to the selected processing strategy, and assigns a bandwidth to the service requested by each node;

and when a retention strategy is selected, it needs to perform computing of a BandWidth map of 1-2 frame sets.

1) when M<=N, M frames in one DBA period uses the same BandWidth map together, and the computing method is as follows:

the state of the service crossing the master node (comprising the state of an add service, the state of a drop service and the state of a link occupied) of a previous correlative frame set is read (when M=N, the previous correlative frame set is namely the set constituted by the M frames in a previous DBA period; and where M<N, the previous correlative frame set is namely the set constituted by the M frames in the previous N/M DBA period); and when a bandwidth is assigned for the present frame set, the corresponding wavelength and the position of the time slot are not assigned for a service, so as to avoid a conflict, and to generate a BandWidth map using for M frames in a DBA period.

2) when M is slightly greater than N, the wavelength and the time slot occupied by a service crossing the master node of the last (M−N) frames in the previous DBA period are eliminated from the first frame set, and a remaining resource in the first frame set is used for assigning a bandwidth for a service request of each node, and a BandWidth map is generated for the first N frames;

and the master node eliminates from the second frame set the wavelength and the time slot occupied by a service crossing the master node of previous N frames in the present DBA period, uses a remaining resource in the second frame set to allocate a bandwidth for a service request of each node, and generates a BandWidth map for the last (M−N) frames. The specific computational method is as follows:

firstly the state of the service crossing the master node (comprising the state of an add service, the state of a drop service and the state of a link occupied) of a previous correlative frame set (i.e. the last (M−N) frames in a previous DBA period) is read, when a bandwidth is assigned for the present frame set (the previous N frames), the corresponding wavelength and the position of the time slot are eliminated to allocate for a service, so as to avoid a conflict, and to generate a BandWidth map used for the first N frames;

and then the state of the service crossing the master node of the previous correlative frame set (i.e. the first N frames in the present DBA period) is read, when a bandwidth is assigned for the present frame set (the last (M−N) frames), the corresponding wavelength and the position of the time slot position are eliminated to allocate for a service, so as to avoid a conflict, and to generate a BandWidth map used for the last (M−N) frames.

Where M is much greater than N, and the elimination strategy is selected, it needs to perform the computing of BandWidth maps for three frame sets: a resource assignment table is initialized, a bandwidth for the service requested by each node is computed and assigned according to a principle of no resource conflict, and the BandWidth map of the second frame set is generated;

the master node eliminates from the second frame set a drop service crossing the master node in the second frame set, and obtains a BandWidth map for the first frame set of the first N frames;

the master node eliminates from the second frame set an add service crossing the master node in the second frame set, and obtains a BandWidth map for the third frame set of the last N frames. Specifically as follows:

1) The method for computing a BandWidth map of the $(N+1)^{th}$ to the $(M-N)^{th}$ frames is as follows:

a resource assignment table is initialized, a resource is assigned for a requested service according to a principle of no resource conflict, and a BandWidth map used for the $(N+1)^{th}$ to the $(M-N)^{th}$ frames in the present DBA period is generated.

2) a drop service crossing the master node is eliminated from the above-mentioned BandWidth map of the $(N+1)^{th}$ to the $(M-N)^{th}$ frames, i.e. a BandWidth map of the first N frames is generated.

3) a add service crossing the master node is eliminated from the above-mentioned BandWidth map of the $(N+1)^{th}$ to the $(M-N)^{th}$ frames, i.e. a BandWidth map of the last N frames is generated.

Step 505, the master node distributes a BandWidth map corresponding to each data frame to each slave node via a control frame according to a frame period; the slave node extracts an add and drop service table related to the present node from the BandWidth map, and performs add and drop operations on data services according to add and drop service information.

With combination of the accompanying drawings, embodiment two of the present disclosure is described hereinafter.

In the embodiment of the present disclosure, the network as shown in FIG. 1 is still used as the application scene, specifically as follow: 1) a network topology is an unidirectional ring network of 4 nodes, wherein the node A is a master node, and the other nodes are slave nodes; 2) each node is configured with a pair of quick tuneable burst transmitter/receiver in a data channel, and is configured with a pair of common transmitter/receiver in a control channel; 3) the data channel of the ring network is configured with two wavelengths, and the control channel is configured with one wavelength. 4) a data frame comprises 10 OB time slots, and a ring period is 4 times of a data frame period; 5) a control frame is generated by a master node, and is transferred along a ring and ends at the master node; and 6) a strategy for processing the service crossing the master node is selected: where a DBA period equals to 4 times of a frame period, a retention strategy is used; and where a DBA period equals to 32 times of a frame period, an elimination strategy is used.

The specific steps of the method for processing the service crossing the master node by using the elimination strategy are as follows:

in step one, at the start of a DBA period, a master node extracts a bandwidth request and quantizes the request into the OB number of each data frame, wherein the quantized request matrix is as shown in FIG. 6.

in step two, the master node judges that the DBA period=the ring period=4 times of the frame period, and preferably selects the retention strategy for the service crossing the master node;

and in step three, the master node performs bandwidth assignment for a requested service according to the retention strategy, and generates a BandWidth map.

Figure 7:
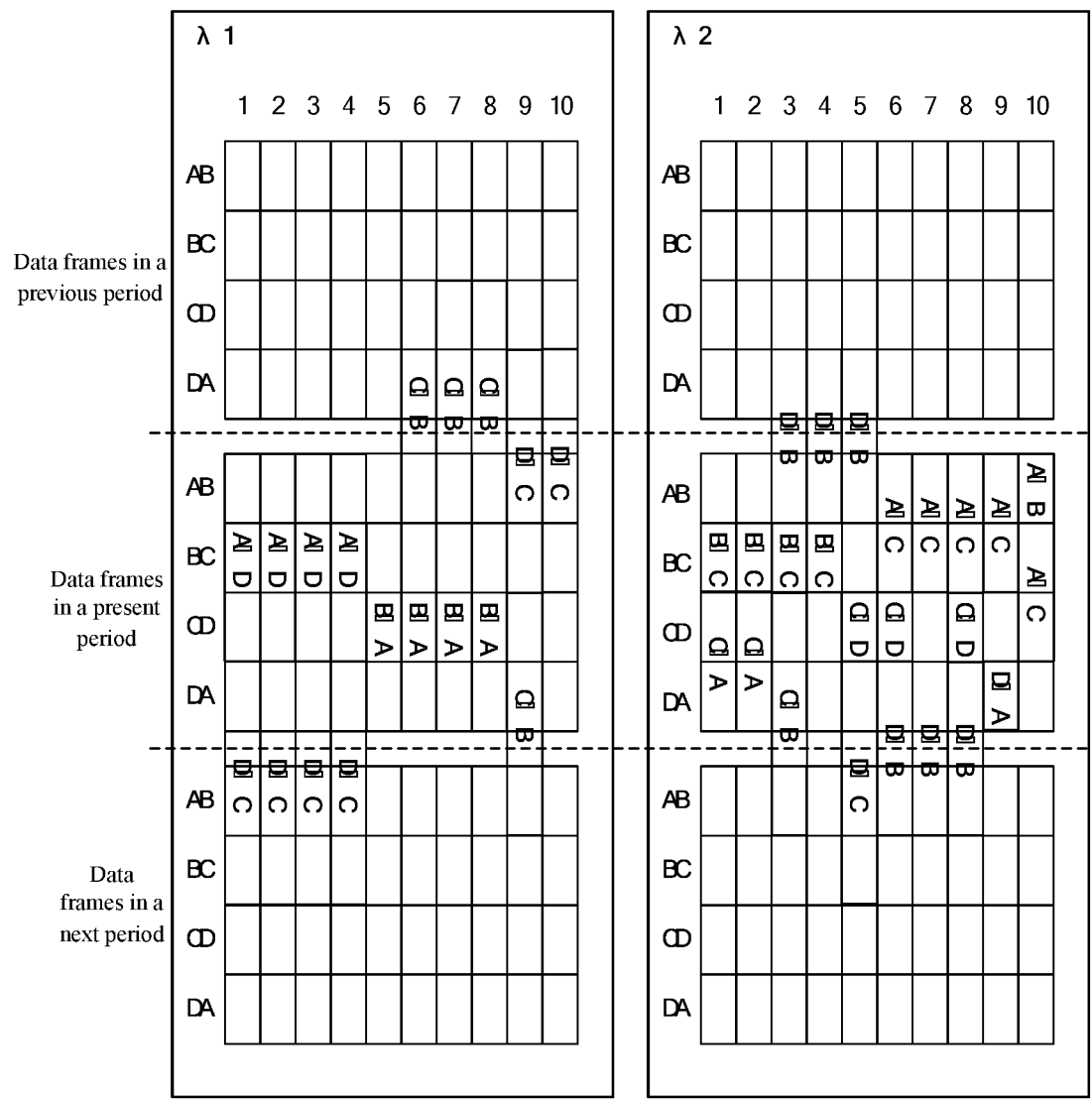
FIG. 7 is a schematic diagram of information of the service crossing the master node about a retention strategy in embodiment two of the present disclosure.

Because the DBA period=the ring period, 4 frames in one DBA period uses the same BandWidth map together, and the computing method is as follows: information of the non-service crossing the master node in a previous DBA period is reset, and only the information of the service crossing the master node is reserved, such as the data frame portion of the previous period as shown in FIG. 7; a resource state table of the present period is initialized, and the information of the state of the service crossing the master node of the previous DBA period is copied into a current state table; and in accordance with the principle of no conflict, each service in a bandwidth request matrix as shown in FIG. 6 is assigned to a resource assignment table, and meanwhile an assignment state (the wavelength, the time slot, the link, the source, and the destination, which are occupied) of the service is recorded to a corresponding position in a state table once one service is successfully assigned every time. For example, the service of A→D in FIG. 6 needs to pass through three links of AB, BC and CD, while three links AB, BC, and CD on a time slot position 1 of a wavelength being λ1 are not occupied, and the transmitter of A on the time slot position 1 is not occupied, and the receiver of D is not occupied, and therefore, the service may be assigned to the time slot position 1 of the wavelength being λ1, and the occupied states of the corresponding link, source, destination are updated. For another example, the time slot position 3 of the wavelength being λ2 in the first frame in the previous DBA period is assigned to a service crossing the master node D→B, which may occupies a link AB and a drop of B in the first frame in the present DBA period, and therefore, the time slot position 3 of the wavelength being λ2 in the current DBA period may no longer be assigned for the service passing through the link AB and the drop of B (e.g. no longer be assigned for an A→B service). A service of the 1st to 4th frames in the previous DBA period may influence a service of the 1st to 4th frames in the present DBA period, and because four frames in one DBA period use the same BandWidth map, it only needs to compute the BandWidth map of the first frame in the present DBA period. A final resource assignment table (a BandWidth map) is as shown in FIG. 8.

Figure 9:
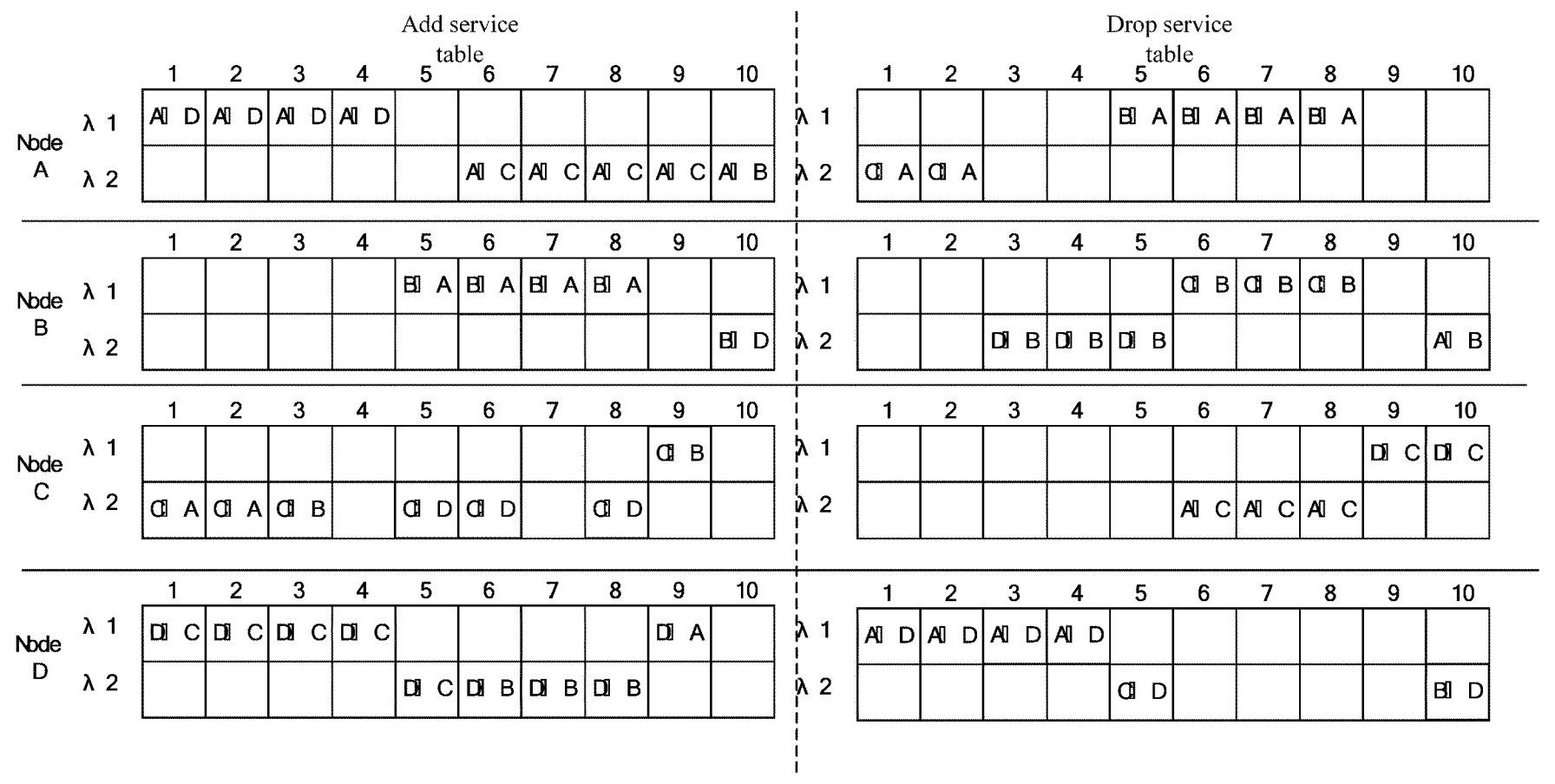

In step four, the master node distributes a BandWidth map corresponding to each data frame to each slave node via a control frame according to a frame period; the slave node extracts an add and drop service table related to the present node from the BandWidth map, and, as shown in FIG. 9, performs add and drop operations on data services according to add and drop service information.

The specific steps of the method for processing service crossing the master node by using a retention strategy are as follows:

in step one, at the start of one DBA period, a master node extracts a bandwidth request and quantizes the request into the OB number of each data frame, wherein the quantized request matrix is as shown in FIG. 10.

in step two, the master node judges that the DBA period=32 times of the frame period, and the ring period=4 times of the frame period, and preferably selects the elimination strategy for processing the service crossing the master node;

in step three, the master node performs bandwidth assignment on a requested service according to the elimination strategy, and generates a BandWidth map.

Firstly, in accordance with a principle of no conflict, each service request in the request matrix is assigned to a resource assignment table, and meanwhile the assignment state (the wavelength, the time slot, the link, source, and the destination, which are occupied) of the service is recorded to the corresponding position in a link usage state table and a source and destination usage state table after one service is successfully assigned every time. The generated resource assignment table (a BandWidth map) is as shown in FIG. 11 and is namely a BandWidth map of the $5^{th}$-$28^{th}$ frames.

Figure 12:
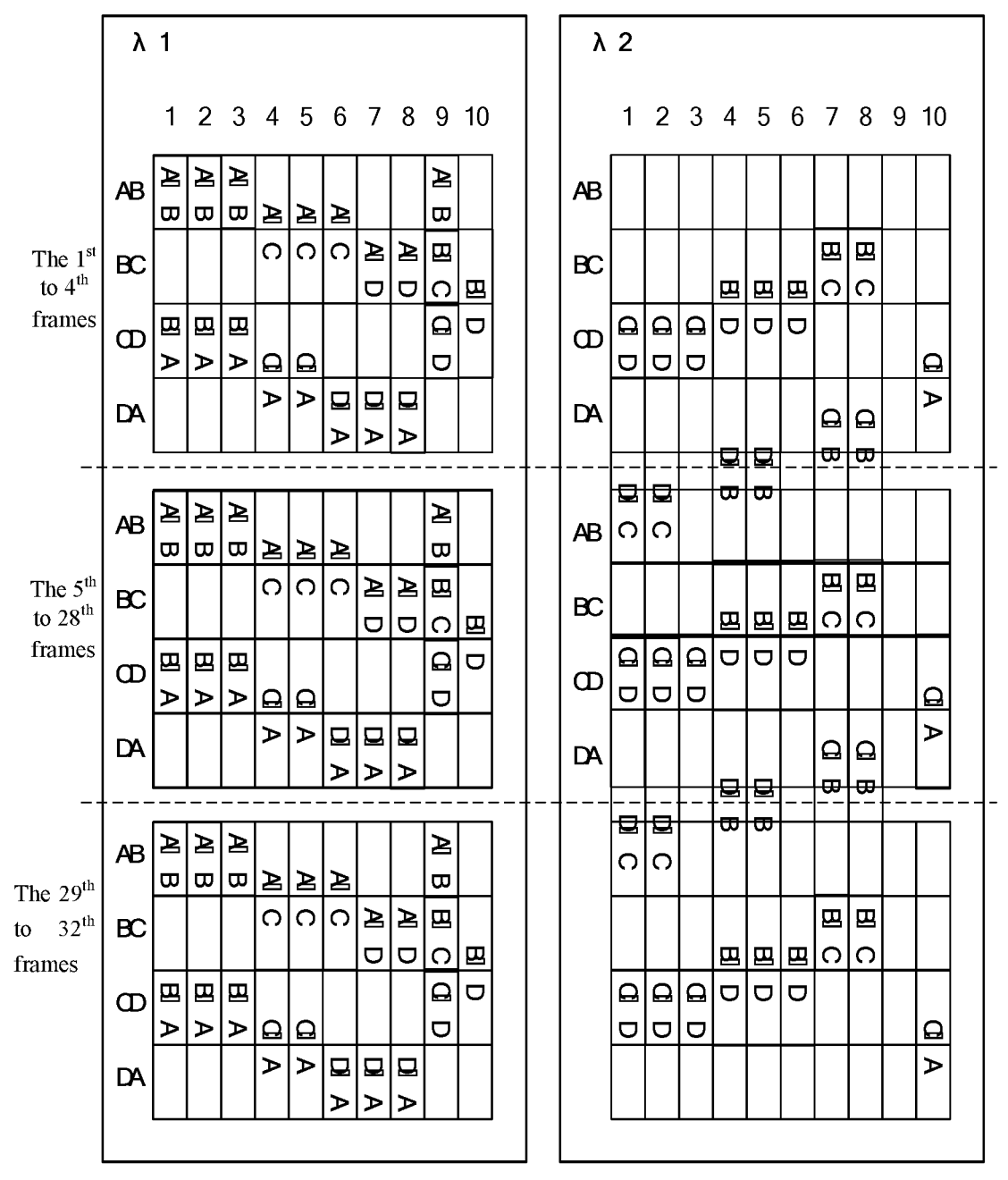

Information of the service crossing the master node (comprising an add service crossing the master node and a drop service crossing the master node) is as shown in FIG. 12. The drop service crossing the master node in the BandWidth map of the $5^{th}$-$28^{th}$ frames is eliminated, e.g. the drop service crossing the master node C→B on the time slot position 7 of the wavelength being λ2 is eliminated, which is namely that BandWidth map of the $1^{st}$ to $4^{th}$ frames is generated. A add service crossing the master mode in the BandWidth map of the $5^{th}$-$28^{th}$ frames is eliminated, e.g. the add service crossing the master node D→B on the time slot position 5 of the wavelength being λ2 is eliminated, which is namely that the BandWidth map of the $29^{th}$ to $32^{th}$ frames is generated.

Figure 13:
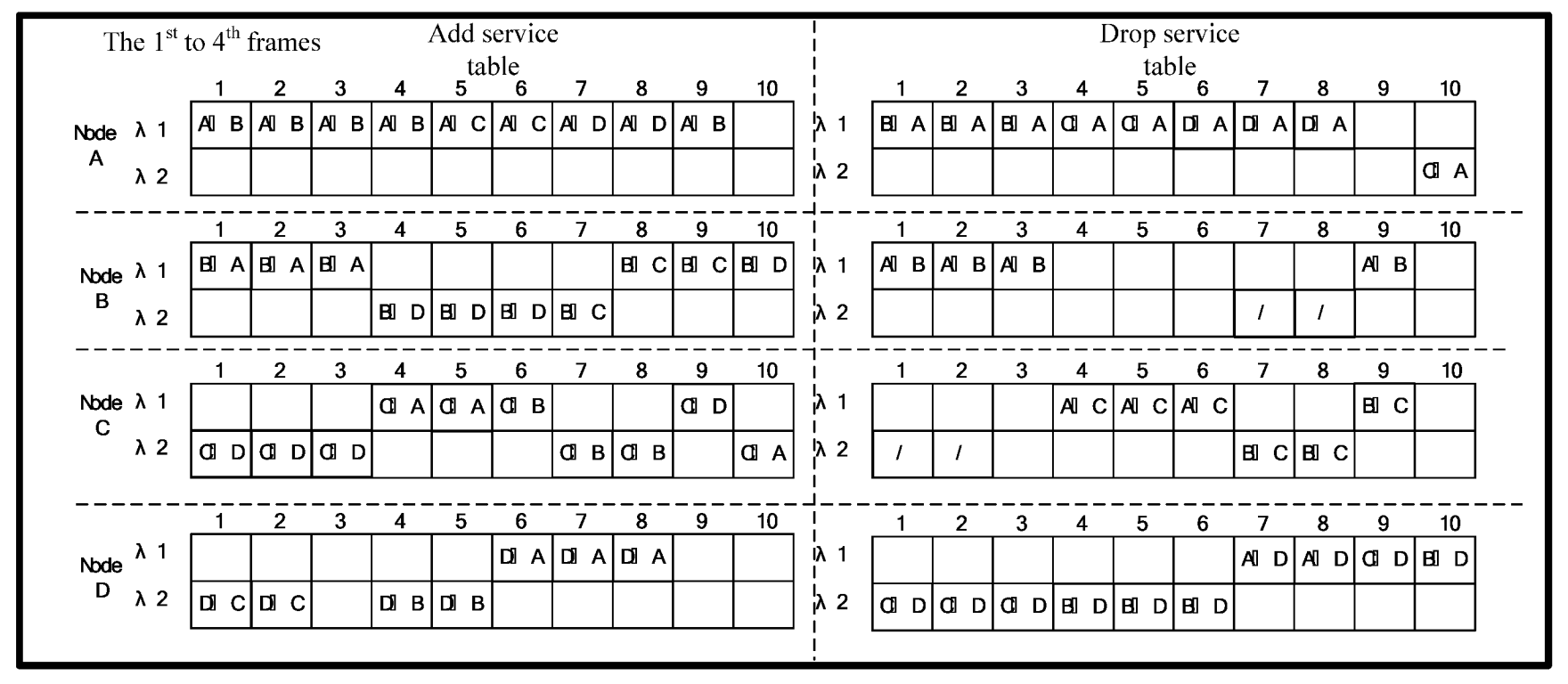
Figure 14:
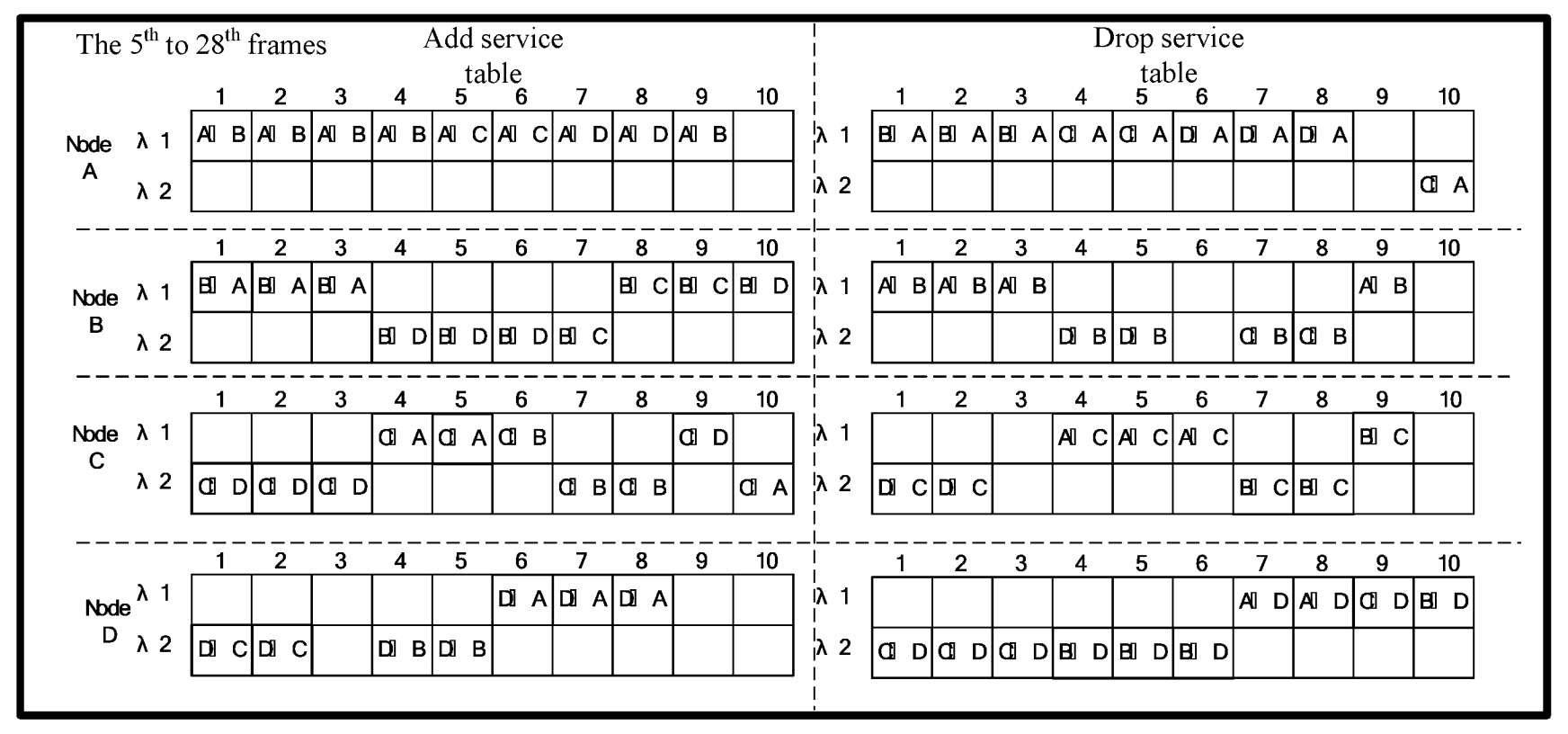
Figure 15:
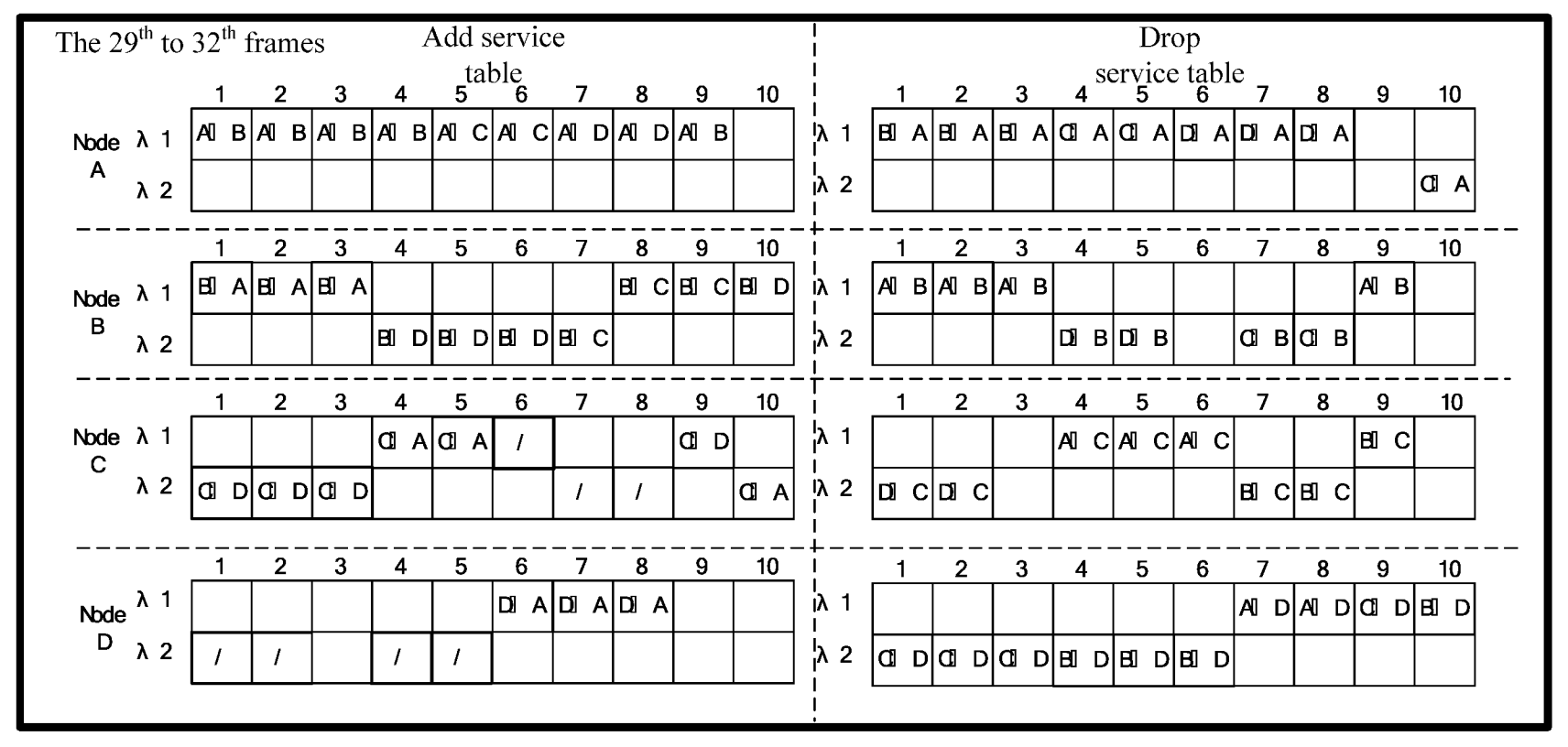

In step four, the master node distributes a BandWidth map corresponding to each data frame to each slave node via a control frame according to a frame period; and the slave node extracts an add and drop service table related to the present node from the BandWidth map, and the add and drop service table comprises the add and drop service table of the $1^{st}$ to $4^{th}$ frames as shown in FIG. 13, the add and drop service table of the $5^{th}$ to $28^{th}$ frames as shown in FIG. 14, and the add and drop service table of the $29^{th}$ to $32^{th}$ frames as shown in FIG. 15. And then the slave node performs add and drop operations on data services according to add and drop service information.

With combination of the accompanying drawings, embodiment three of the present disclosure is described hereinafter.

Figure 16:
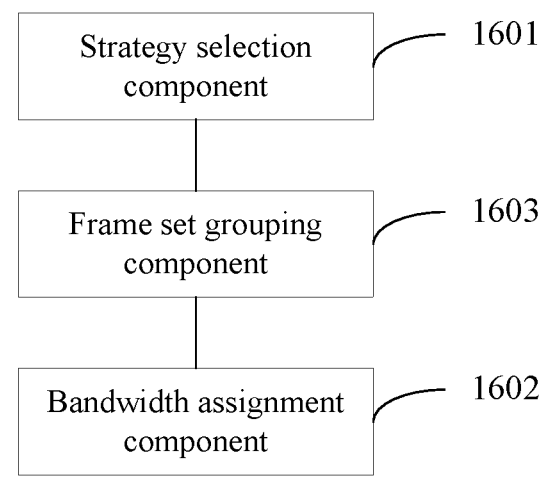
FIG. 16 is a structural schematic diagram of a device for processing a service crossing the master node provided in embodiment three of the present disclosure.

The device for processing the service crossing the master node is provided in the embodiment of the present disclosure, and the structure of the device is shown in FIG. 16, comprising:

a strategy selection component 1601, configured to select a processing strategy when assigning a bandwidth for a service requested by each node within the present DBA period;

and a bandwidth assignment component 1602, configured to eliminate a resource conflict caused by a service crossing the master node according to the selected processing strategy, and allocate a bandwidth for the service requested by each node.

The DBA period is M times of a frame period, a ring period is N times of the frame period, and M is an integral multiple of N or N is an integral multiple of M. The strategy selection component 1601 is configured to select a processing strategy to the service crossing the master node according to the requirement of the DBA operation, wherein the processing strategy comprises a retention strategy and/or an elimination strategy, and the strategy selection component 1601 comprising:

a first selection element configured to select the retention strategy where M is slightly greater than N or M=N or M<N;

and a second selection element configured to select the elimination strategy where M is much greater than N.

In an example embodiment, the device further comprises:

a frame set dividing component 1603, configured to group a plurality of consecutive data frames that uses the same BandWidth map within one DBA period into one frame set.

In an example embodiment, the frame set dividing component 1603 comprises:

a first grouping element configured to group M frames in one DBA period into one frame set where M<N;

a second grouping element configured to group M frames in one DBA period into one frame set where M=N;

a third grouping element configured to group the previous N frames in one DBA period into a first frame set, and group the next (M−N) frames into a second frame set where M is slightly greater than N;

and a fourth grouping element configured to group the previous N frames in one DBA period into a first frame set, group the $(N+1)^{th}$ to the $(M-N)^{th}$ frames into a second frame set, and group the last N frames into a third frame set where M is much greater than N.

In an example embodiment, the bandwidth assignment component 1602 comprises:

a first allocating element configured to, where M<N, eliminate from the frame set a wavelength and a time slot position occupied by a service crossing the master node of M frames in the previous N/M DBA periods, use remaining resources in the frame set to allocate a bandwidth for the service request of each node, and generate a BandWidth map for M frames in one DBA period;

a second allocating element configured to, where M=N, eliminate from the frame set a wavelength and a time slot position occupied by the service crossing the master node of M frames in the previous DBA period, use remaining resources in the frame set to allocate a bandwidth to the service request of each node, and generate a BandWidth map for M frames in one DBA period;

a third assignment element, configured to, where M is slightly greater than N, eliminate from the first frame set a wavelength and a time slot occupied by a service crossing the master node of last (M−N) frames in the previous DBA period, use remaining resources in the first frame set to allocate a bandwidth to a service request of each node, generate a BandWidth map for the first N frames, eliminate from the second frame set a wavelength and a time slot occupied by a service crossing the master node of first N frames in the present DBA period, use remaining resources in the second frame set to allocate a bandwidth to a service request of a slave node, and generate a BandWidth map for last (M−N) frames;

and a fourth assignment element configured to, where M is much greater than N, initialize a resource assignment table, calculate a bandwidth of the service requested by each node and allocate the bandwidth according to the principle of no resource conflict, generate a BandWidth map for the second frame set, eliminate from the second frame set the drop service crossing the master node in the second frame set, obtain a BandWidth map for the first frame set of the first N frames, and eliminate from the second frame set the add service crossing the master node in the second frame set, and obtain a BandWidth map for the third frame set of the last N frames.

A method and device for processing a service crossing the master node are provided, wherein when assigning a bandwidth for a service requested by each node within the present DBA period, a master node selects a processing strategy; and the master node eliminates, according to the selected processing strategy, a resource conflict caused by the service crossing the master node, and assigns a bandwidth to the service requested by each node, thereby implementing highly reliable OBTN resource scheduling, and solving a problem of a resource conflict caused by the service crossing the master node in an OBTN.

The person of ordinary skill in the art can understand that all or part of the steps in the aforementioned embodiment can be completed with a computer program procedure, and the computer program procedure can be stored in a computer readable storage medium and is executed in the corresponding hardware platform (such as a system, device, apparatus, equipment, and so on), during the execution, it comprises one of the steps in the method embodiment, or a combination thereof.

Optionally, all or part of the steps in the aforementioned embodiments can also be achieved with the integrated circuit (IC), and these steps can be made into integrated circuit components, or multiple components or steps of all the steps can be made into a single integrated circuit component to achieve. In this way, the present disclosure is not restricted to any particular hardware and software combination.

Each device/functional component/functional element in the aforementioned embodiments can be achieved with the universal computing device. They can be concentrated in a single computing device, or distributed over a network composed of multiple computing devices.

Each device/functional component/functional unit in the aforementioned embodiments is achieved in the form of a software function component, and is sold or used as a standalone product, and it can be stored in a computer-readable storage medium. The aforementioned computer readable storage medium might be a read-only memory, disk, or CD-ROM.

Any variation or replacement made by persons skilled in the art without departing from the spirit of the present disclosure shall fall within the protection scope of the present disclosure. Therefore, the protection scope of the present disclosure shall be subject to the appended claims.

INDUSTRIAL APPLICABILITY

As stated above, a method and device for processing a service crossing the master node are provided in the embodiments of the present disclosure, which bring the following beneficial effects: when assigning the bandwidth for the service requested by each node within the present DBA period, the master node selects a processing strategy; and the master node eliminates, according to the selected processing strategy, a resource conflict caused by the service crossing the master node, and assigns the bandwidth to the service requested by each node, thereby implementing highly reliable OBTN resource scheduling.

What is claimed is:

1. A method for processing a service crossing a master node, comprising:
   selecting, by the master node, a processing strategy when assigning a bandwidth for a service requested by each node within a present Dynamic Bandwidth Assignment (DBA) period, wherein the processing strategy applied to a case where a resource conflict caused by the service crossing the master node; and
   eliminating, by the master node, the resource conflict caused by the service crossing the master node according to the selected processing strategy, and assigning, by the master node, the bandwidth for the service requested by the each node;
   wherein selecting, by the master node, the processing strategy when assigning the bandwidth for the service requested by the each node within the present DBA period comprises:
   selecting, by the master node, the processing strategy for the service crossing the master node according to a requirement of a DBA operation, wherein the processing strategy comprises at least one of the following: a retention strategy or an elimination strategy;
   wherein the retention strategy comprises: a state of the service crossing the master node of a previous correlative frame is transmitted to a present frame set; and the elimination strategy comprises: a service crossing the master node is eliminated from the previous correlative frame set;
   wherein a DBA period is M times of a frame period, a ring period is N times of the frame period, M and N are integers, and M is an integral multiple of N or N is an integral multiple of M, and the selecting, by the master node, the processing strategy for the service crossing the master node according to the requirement of the DBA operation, wherein the processing strategy comprises at least one of the following: the retention strategy or the elimination strategy, comprises:
   in a case where M is slightly greater than N or M=N or M<N, selecting the retention strategy; and
   in a case where M is much greater than N, selecting the elimination strategy;
   wherein when M is not greater than 8 times of N, M is slightly greater than N; when M is greater than or equal to 8 times of N, M is much greater than N.

2. The method for processing the service crossing the master node as claimed in claim 1, wherein after selecting, by the master node, the processing strategy when assigning the bandwidth for the service requested by the each node within the present DBA period, the method further comprises:
   grouping a plurality of consecutive data frames that use a same BandWidth map within one DBA period into one frame set.

3. The method for processing the service crossing the master node as claimed in claim 2, wherein grouping the plurality of the consecutive data frames that use the same BandWidth map within one DBA period into one frame set comprises:
   where M<N, grouping M frames in one DBA period into one frame set, or,
   where M=N, grouping M frames in one DBA period into one frame set, or, where M is slightly greater than N, grouping previous N frames in one DBA period into a first where M is much greater than N, grouping previous N frames in one DBA period into a first frame set, grouping $(N+1)^{th}$ to $(M-N)^{th}$ frames into a second frame set, and grouping last N frames into a third frame set.

4. The method for processing the service crossing the master node as claimed in claim 3, wherein where M<N, eliminating, by the master node, the resource conflict caused by the service crossing the master node according to the selected processing strategy and assigning the bandwidth for the service requested by the each node comprises:

eliminating, by the master node, from the frame set a wavelength and a time slot position occupied by the service crossing the master node of M frames in previous N/M DBA periods; and using, by the master node, remaining resources in the frame set to assign the bandwidth for the service requested by the each node and generating, by the master node, a BandWidth map for M frames in one DBA period.

5. The method for processing the service crossing the master node as claimed in claim 3, wherein where M=N, eliminating, by the master node, the resource conflict caused by the service crossing the master node according to the selected processing strategy and assigning the bandwidth for the service requested by the each node comprises:

eliminating, by the master node, from the frame set a wavelength and a time slot position occupied by the service crossing the master node of M frames in one previous DBA period; and using, by the master node, remaining resources in the frame set to assign the bandwidth for the service requested by the each node and generating, by the master node, a BandWidth map for M frames in one DBA period.

6. The method for processing the service crossing the master node as claimed in claim 3, wherein where M is slightly greater than N, eliminating, by the master node, the resource conflict caused by the service crossing the master node according to the selected processing strategy and assigning the bandwidth for the service requested by the each node comprises:

eliminating, by the master node, from the first frame set a wavelength and a time slot occupied by the service crossing the master node of last (M-N) frames in one previous DBA period, using, by the master node, remaining resources in the first frame set to assign the bandwidth for the service requested by the each node, and generating, by the master node, a BandWidth map for the previous N frames; and eliminating, by the master node, from the second frame set a wavelength and a time slot occupied by the service crossing the master node of the first N frames in the present DBA period, using, by the master node, remaining resources in the second frame set to assign a bandwidth for the service requested by the each node, and generating, by the master node, a BandWidth map for the last (M-N) frames.

7. The method for processing the service crossing the master node as claimed in claim 3, wherein where M is much greater than N, eliminating, by the master node, the resource conflict caused by the service crossing the master node according to the selected processing strategy and assigning the bandwidth for the service requested by the each node comprises:

initializing a resource assignment table, calculating and assigning a bandwidth for the service requested by the each node according to a principle of no resource conflict, and generating a BandWidth map of the second frame set;

eliminating, by the master node, from the second frame set a drop service crossing the master node in the second frame set, and obtaining a BandWidth map for the first frame set of the previous N frames; and eliminating, by the master node, from the second frame set an add service crossing the master node in the second frame set, and obtaining a BandWidth map for the third frame set of the last N frames.

8. A device for processing a service crossing a master node, comprising a hardware processor, configured to perform programming components stored in a memory, wherein the programming components comprises:

a strategy selection component, configured to select a processing strategy for processing the service crossing the master node when assigning a bandwidth for a service requested by each node within a present Dynamic Bandwidth Assignment (DBA) period, wherein the processing strategy applied to a case where a resource conflict caused by the service crossing the master node; and a bandwidth assignment component, configured to eliminate the resource conflict caused by the service crossing the master node according to the selected processing strategy, and assign the bandwidth for the service requested by the each node;

wherein the strategy selection component is configured to select the processing strategy for the service crossing the master node according to a requirement of a DBA operation, wherein the processing strategy comprises at least one of the following: a retention strategy or an elimination strategy;

wherein the retention strategy comprises: a state of the service crossing the master node of a previous correlative frame is transmitted to a present frame set; and the elimination strategy comprises: a service crossing the master node is eliminated from the previous correlative frame set;

wherein a DBA period is M times of a frame period, a ring period is N times of the frame period, M and N are integers, and M is an integral multiple of N or N is an integral multiple of M, and the strategy selection component comprises:

a first selection element, configured to select the retention strategy in a case where M is slightly greater than N or M 32 N or M<N; and a second selection element, configured to select the elimination strategy in a case where M is much greater than N;

wherein when M is not greater than 8 times of N, M is slightly greater than N; when M is greater than or equal to 8 times of N, M is much greater than N.

9. The device for processing the service crossing the master node as claimed in claim 8, wherein the device further comprises:

a frame set grouping component, configured to group a plurality of consecutive data frames that use a same BandWidth map within one DBA period into one frame set.

10. The device for processing the service crossing the master node as claimed in claim 9, wherein the frame set grouping component comprises:

a first grouping element, configured to group M frames in one DBA period into one frame set where M<N;

a second grouping element, configured to group M frames in one DBA period into one frame set where M=N;

a third grouping element, configured to group previous N frames in one DBA period into a first frame set, and group next (M−N) frames into a second frame set where M is slightly greater than N; and a fourth grouping element, configured to group previous N frames in one DBA period into a first frame set, group $(N+1)^{th}$ to $(M-N)^{th}$ frames into a second frame set, and group last N frames into a third frame set where M is much greater than N.

11. The device for processing the service crossing the master node as claimed in claim 10, wherein the bandwidth assignment component comprises:

a first assignment element, configured to, where M<N, eliminate from the frame set a wavelength and a time slot position occupied by the service crossing the master node of M frames in previous N/M DBA periods, use remaining resources in the frame set to assign the bandwidth for the service requested by the each node, and generate a BandWidth map for M frames in one DBA period;

a second assignment element, configured to, where M=N, eliminate from the frame set a wavelength and a time slot position occupied by the service crossing the master node of M frames in one previous DBA period, use remaining resources in the frame set to assign the bandwidth for the service requested by the each node, and generate a BandWidth map for M frames in one DBA period;

a third assignment element, configured to, where M is slightly greater than N, eliminate from the first frame set a wavelength and a time slot occupied by the service crossing the master node of last (M−N) frames in one previous DBA period, use remaining resources in the first frame set to assign the bandwidth for the service requested by the each node, generate a BandWidth map for the previous N frames, and eliminate from the second frame set a wavelength and a time slot occupied by the service crossing the master node of the first N frames in the present DBA period, use remaining resources in the second frame set to assign a bandwidth for the service requested by the each node, and generate a BandWidth map for the last (M−N) frames; and a fourth assignment element, configured to, where M is much greater than N, initialize a resource assignment table, calculate a bandwidth for the service requested by the each node and assign the bandwidth according to a principle of no resource conflict, generate a BandWidth map for the second frame set, eliminate from the second frame set a drop service crossing the master node in the second frame set, obtain a BandWidth map for the first frame set of the previous N frames, and eliminate from the second frame set an add service crossing the master node in the second frame set, and obtain a BandWidth map for the third frame set of the last N frames.

* * * * *